US009825908B2

(12) United States Patent  
Anschutz

(10) Patent No.: US 9,825,908 B2  
(45) Date of Patent: Nov. 21, 2017

(54) SYSTEM AND METHOD TO MONITOR AND MANAGE IMPERFECT OR COMPROMISED SOFTWARE

(71) Applicant: AT&T Intellectual Property I, LP, Atlanta, GA (US)

(72) Inventor: Thomas A. Anschutz, Conyers, GA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 539 days.

(21) Appl. No.: 14/103,024

(22) Filed: Dec. 11, 2013

(65) Prior Publication Data

US 2015/0163088 A1   Jun. 11, 2015

(51) Int. Cl.

| G06F 15/173 | (2006.01) |
| H04L 29/06 | (2006.01) |
| G06F 11/36 | (2006.01) |
| G06F 21/57 | (2013.01) |
| G06F 9/455 | (2006.01) |
| G06F 11/30 | (2006.01) |

(52) U.S. Cl.
CPC .......... *H04L 63/00* (2013.01); *G06F 9/45558* (2013.01); *G06F 11/30* (2013.01); *G06F 11/36* (2013.01); *G06F 21/57* (2013.01); *G06F 2009/45591* (2013.01)

(58) Field of Classification Search
CPC ...... G06F 21/57; G06F 11/30; G06F 9/45558; H04L 63/00
USPC ....................................................... 709/224
See application file for complete search history.

(56) References Cited

U.S. PATENT DOCUMENTS

| 8,402,462 B2* | 3/2013 | Ciano ................... G06F 9/4862 718/1 |
| 8,490,091 B2 | 7/2013 | Bozek et al. |
| 2004/0172406 A1* | 9/2004 | Marilly .................. H04L 12/14 |

(Continued)

OTHER PUBLICATIONS

Perez-Botero et al., "Characterizing Hypervisor Vulnerabilities in Cloud Computing Servers", Proceedings of the Workshop on Security in Cloud Computing (SCC), pp. 1-8 (May 2013).

(Continued)

*Primary Examiner* — James Conaway  
(74) *Attorney, Agent, or Firm* — Hoffmann & Baron, LLP

(57) ABSTRACT

A method of increasing integrity associated with a computer network, which includes determining a model operational parameter associated with an application operating at a predetermined integrity level on the computer network, the model operational parameter is associated with operation of a layer above the agent layer as the application operates at the predetermined integrity level and interacts with the layer above the agent layer, generating an operational model associated with the application performing at the predetermined integrity level, detecting a current operational parameter associated with the application operating at a current integrity level on the computer network, determining an exception associated with the operational model based on a comparison between the model operational parameter and the current operational parameter, and generating an instruction from the agent layer to resolve the exception, thereby increasing integrity of the computer network. A corresponding system and computer-readable device are also disclosed.

20 Claims, 5 Drawing Sheets

(56) References Cited

U.S. PATENT DOCUMENTS

| | | | |
|---|---|---|---|
| 2005/0198275 A1* | 9/2005 | D'Alo | G06F 11/3006 709/224 |
| 2008/0148346 A1* | 6/2008 | Gill | H04L 63/20 726/1 |
| 2010/0100774 A1* | 4/2010 | Ding | G06F 11/3636 714/45 |
| 2010/0218104 A1* | 8/2010 | Lewis | G06Q 10/04 715/736 |
| 2011/0072431 A1 | 3/2011 | Cable et al. | |
| 2011/0078680 A1 | 3/2011 | Lagergren et al. | |
| 2011/0225459 A1 | 9/2011 | Fahrig et al. | |
| 2011/0276951 A1 | 11/2011 | Jain | |
| 2012/0030672 A1 | 2/2012 | Zygmuntowicz et al. | |
| 2012/0246641 A1 | 9/2012 | Gehrmann | |
| 2012/0297057 A1 | 11/2012 | Ghosh et al. | |
| 2012/0317568 A1 | 12/2012 | Aasheim | |
| 2013/0055261 A1 | 2/2013 | Han et al. | |
| 2013/0097354 A1 | 4/2013 | Arges et al. | |
| 2013/0263277 A1* | 10/2013 | Ely | G06F 21/78 726/26 |
| 2013/0275568 A1* | 10/2013 | Nguyen | H04L 41/5025 709/223 |
| 2014/0007097 A1* | 1/2014 | Chin | G06F 9/45533 718/1 |
| 2015/0106348 A1* | 4/2015 | Kapur | G06F 11/36 707/703 |
| 2015/0280962 A1* | 10/2015 | Basu | H04L 41/022 709/223 |

OTHER PUBLICATIONS

"Guidelines on Security and Privacy in Public Cloud Computing", NIST, Special Publication 800-144, pp. 1-80 (Dec. 2011).

* cited by examiner

SYSTEM AND METHOD TO MONITOR AND MANAGE IMPERFECT OR COMPROMISED SOFTWARE

BACKGROUND

Technical Field

The present disclosure relates to a system and method to provide a service assurance agent to an infrastructure having a common platform capability that supports an application, operating system and/or hypervisor operating on the infrastructure, and more specifically relates to a system and method for implementing the service assurance agent to determine model operating parameters for the system functioning at a predetermined integrity level, thereby making it possible to monitor for exceptions from an operational model. Once any such exceptions are detected, the agent delivers appropriate instructions to the policy function layer for required action, whether it is a resolution of the problem or a mere monitoring and noting of an anomaly from operations at a predetermined integrity level for possible resolution at a later time.

Related Art

Typical computer environments implement computing resources that are part of individual computing hardware in order to service clients. However, with more recent developments of technology in the computer network field, computer environments have also evolved into cloud computing environments. Such systems provide services using available computer resources available over a network without end-use knowledge of physical location and configurations of respective physical computer resources. Such environments also permit a plurality of independent virtual machines, even using single physical computing hardware. These systems can independently run an operating system and applications through virtual machines.

While these virtual computing environments can allocate hardware resources, they often require a hypervisor software program installed in at least physical systems, which essentially controls and manages the operation of applications and operating system through a series of virtual machines. A hypervisor may be referred to as a virtual machine monitor (VMM). A virtual machine may perform file input/output operations through the hypervisor among other functions. A partial or complete simulation of actual hardware permits software to operate unaltered.

Virtual machines also enable the execution of multiple isolated operating system instances on a single physical machine. This increases resource utilization, simplifies administrative tasks, lowers overall power consumption, and enables users to obtain computing resources on demand, but often requires the use of a hypervisor layer which often lies between the virtual machines (VMs) and the physical hardware.

However, with the emergence of such virtualized systems, security concerns for embedded systems have increased. These concerns can range from mere reliability, normal operations, robust execution, and reliable network access to more problematic security issues, such as higher protection from software attackers, including viruses, and other fraudulent attackers.

SUMMARY

Embodiments of the disclosure will become apparent from the following detailed description considered in conjunction with the accompanying drawings. It is to be understood, however, that the drawings are designed as an illustration only and not as a definition of the limits of this disclosure.

The disclosed technology is directed to a method of increasing integrity associated with a computing system in a computer network, which includes determining a model operational parameter associated with an application operating at a predetermined integrity level on the computer network, the model operational parameter being associated with operation of a layer above the agent layer as the application operates at the predetermined integrity level and interacts with the layer above the agent layer, generating an operational model associated with the application performing at the predetermined integrity level, the agent layer using the operational model to monitor the computer network, detecting a current operational parameter associated with the application operating at a current integrity level on the computer network, the current operational parameter being associated with operation of the layer above the agent layer as the application operates at a current integrity level and interacts with the layer above the agent layer, determining an exception associated with the operational model based on a comparison between the model operational parameter and the current operational parameter and generating, using the processing device, an instruction from the agent layer to resolve the exception, thereby increasing the integrity of the computer network.

The disclosed method of increasing integrity associated with a computing system in a computer network may further include the operational parameter is associated with operation of an operating system as the operating system interacts with a hypervisor layer at the predetermined integrity level. The method may also include the model operational parameter being associated with operation of an operating system as the operating system interacts with a virtual machine at the predetermined integrity level. The method may further comprise modifying the model operational parameter in response to the instruction to resolve the exception and increase integrity of the computer network. The method may yet further include modifying the operational model in response to the exception. The method may yet further include the current operational parameter being associated with operation of the operating system as the operating system currently interacts with a hypervisor layer at the current integrity level. The method may further include the current operational parameter being associated with operation of the operating system as the operating system currently interacts with a virtual machine at the current integrity level. The method may yet further include the model operational parameter being associated with operation of the application as the application interacts with a hypervisor layer at the predetermined integrity level. The method may also include the model operational parameter being associated with operation of the application as the application interacts with a virtual machine at the predetermined integrity level.

The disclosed technology is further directed to a system and apparatus to increase integrity of a computer network, which includes a processing device, and a memory to store instructions that, when executed by the processing device, perform operations comprising determining a model operational parameter associated with an agent function supported by an agent layer of the computing system, the model operational parameter being associated with operations of a layer above the agent layer, the application operates at the predetermined integrity level and interacts with the layer above the agent layer, generating an operational model associated with the application performing at the predetermined integrity level, the agent layer using the operational model to monitor the computer network, detecting a current operational parameter associated with the application operating at a current integrity level on the computer network, the current operational parameter being associated with operation of the layer above the agent layer as the application operates at a current integrity level and interacts with the layer above the agent layer, determining an exception associated with the operational model based on a comparison between the model operational parameter and the current operational parameter, and generating an instruction from the agent layer to resolve the exception, thereby increasing the integrity of the computer network.

The disclosed technology is yet further directed to a computer-readable device to store instructions that, when executed by a processing device associated with an agent function and supported by an agent layer of the computing system, perform operations to increase integrity of a computer network, wherein the operations include determining a model operational parameter associated with an application operating at a predetermined integrity level on the computer network, the model operational parameter being associated with operation of a layer above the agent layer as the application operates at the predetermined integrity level and interacts with the layer above the agent layer, generating an operational model associated with the application performing at the predetermined integrity level, the agent layer using the operational model to monitor the computer network, detecting a current operational parameter associated with the application operating at a current integrity level on the computer network, the current operational parameter being associated with operation of the layer above the agent layer as the application operates at the current integrity level and interacts with the layer above the agent layer, determining an exception associated with the operational model based on a comparison between the model operational parameter and the current operational parameter, and generating an instruction from the agent layer to resolve the exception, thereby increasing the integrity of the computer network.

Embodiments will become apparent from the following detailed description, which is to be read in connection with the accompanying drawings.

BRIEF DESCRIPTION OF THE DRAWINGS

The drawings constitute a part of this disclosure and include examples, which may be implemented in various forms. It is to be understood that in some instances, various aspects of the disclosure may be shown exaggerated or enlarged to facilitate understanding. The teaching of the disclosure can be readily understood by considering the following detailed description in conjunction with the accompanying drawings.

Figure 1:
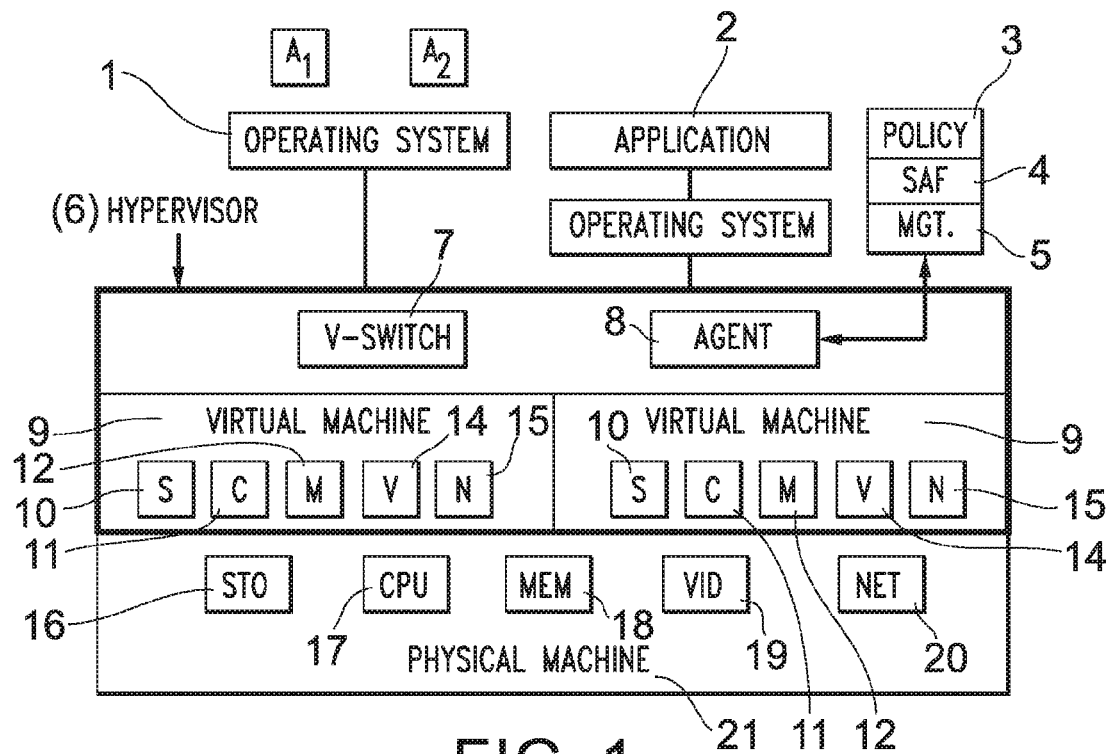
FIG. 1 is a block diagram of a first embodiment of a system assurance agent implemented in an exemplary software architecture including virtual machine infrastructure.

It is to be appreciated that elements in the figures are illustrated for simplicity and clarity. Common but well-understood elements, which may be useful or necessary in a commercially feasible embodiment, are not necessarily shown in order to facilitate a less hindered view of the illustrated embodiments.

DETAILED DESCRIPTION

Different areas of hypervisor functionalities that may expose an infrastructure to certain vulnerabilities by virtue of having these functionalities are: 1) virtualized hardware infrastructures including virtual central processing units (CPUs), symmetric multiprocessing (SMP), soft memory management, interrupt and timer mechanisms, input/output (I/O) and networking, and paravirtualized I/O; 2) mechanisms to delegate sensitive operations to hypervisors including VM exits and hypercalls; 3) VM Management (configure, start, pause and stop of VMs); 4) remote management software; and 5) various optional hypervisor add-on modules.

The kinds of vulnerabilities resulting from implementing such hypervisor functionalities on similar infrastructures include disclosure of hypervisor memory contents through virtual central processing unit (vCPU) registers due to, for example, an incomplete initialization of the vCPU data structures, such as one of the padding fields not being zeroed-out. Oftentimes, memory for the data structure is located in kernel space, and the padding field may contain information from data structures previously accessed by the hypervisor. The hypervisor code may cause SMP vulnerabilities arising from hypervisor code making assumptions only true on, for example, a single-threaded process. A soft memory management implementation may inadvertently permit an unprivileged application running inside a kernel-based virtual machine (KVM) to leverage access to a frame buffer to trick the VM into executing a malicious instruction that modifies the same VM's kernel—space memory.

Yet another vulnerability is that the interrupt and time mechanisms may malfunction if lack of validation of the data contained in the programmable interval time (PIT) data structure enables a rogue VM to cause a full host operating system (OS) crash, which is essentially considered a serious denial-of-service attack. Yet a further vulnerability is the I/O and networking function, in which the hypervisor emulates I/O and networking functions. The failure to clean up, by some virtual devices, results in use-after-free issues, in which data structures that were previously being implemented by a hot-unplugged virtual device remain in memory and can be hijacked with executable code by an attacker. Yet a further vulnerability is an instance that allows paravirtualized front-end drivers to cause denial-of-service conditions and execute arbitrary code with certain privileges. This can occur by sending a malicious shared frame buffer descriptor to trick the system into allocating an arbitrarily large internal buffer.

VM exits are the mechanism in which the hypervisor can intercept and carry out operations invoked by guest VMs that require certain root privileges. These VM-to-hypervisor interfaces are architecture-dependent and usually rely on restrictive bitwise operations. The VM exit handling code is generally not susceptible to vulnerabilities other than a host or guest VM crash. Hypercall vulnerabilities can present an attacker, which may control a guest VM, with the ability to attain privileges over the host system's resources. Yet a further vulnerability is hypervisor add-ons which have modular designs that permit extensions to basic functionalities. Such add-ons may increase the likelihood of hypervisor vulnerabilities being present, since they can increase the size of the hypervisor's codebase.

Therefore, the addition of a hypervisor may cause a system to be more susceptible to attack and other aforementioned vulnerabilities. There are additional methods, application programming interfaces, channels (e.g., sockets) and data items (e.g., input strings) that an attacker may user to damage the computer system. This increased complexity is also evident in virtual machine environments, which can also give rise to conditions that undermine security. Therefore, there is a current need to manage virtual machine environments that emulate the computer architecture and functions of a computer or any network system that operates using a hypervisor layer, whether in a cloud computing setup or virtualized-type structure, to increase the integrity level in such operations as well as decrease vulnerabilities to malicious security attacks.

The use of various applications including operation system(s) implemented in either non-virtualized or virtualized computing environments including those that do not include an additional hypervisor layer, may also be susceptible to intentional and unintentional errors and bugs resulting for various reasons. The source of such errors may stem from faulty software development or the code may become corrupt during use from various sources including hacking, malicious attacks or similar virus-like code. These kinds of problems can diminish the integrity level of the system's architecture and software environments whether virtualized or non-virtualized. Such systems that run these applications and/or operating systems may also experience a compromised level of integrity due to mere faulty software applications and/or faulty operating systems that interact with such systems.

Increased use of agile software development methods have resulted in delivery of final software products with less testing and validation, and shorter development times. The resulting software is generally less robust than desired. Moreover, even in situations in which the software itself is generally not an original source of error, software is increasingly susceptible to attack using errant protocols or data sets that force the software to fail and/or become infected with software worms or viruses. Software security is fragile and getting more susceptible to security attacks as time-to-market pressures increase. Therefore, there is a need to protect and fortify developing software in order to support business goals.

Most virtualized platforms are able to be configured to form software-based switches and network configurations as part of a virtual environment in order to permit virtual machines on the same host to communicate more efficiently. Systems duplicate physical network protection capabilities in order to address loss of visibility and protection against intra-host attacks. Some hypervisors also allow network monitoring, but their capabilities are generally not as robust as the tools often used to monitor physical networks. Virtual machine images entail the software stack, including an operating system and/or installed and configured applications. Virtual machine images may include a pristine machine configuration ready to boot, or may include runtime state or state of a previous checkpoint in order to configure the state of a Virtual machine to match a snapshot taken from a previous point in time. Sharing virtual machine images is one practice used in cloud computing environments as a quick way to get started. However, images must be kept up-to-date with the latest security patches to avoid security attacks. There are risks associated with users running tainted images that can increase theft and/or corruption of data. Therefore, there is a need for management and system assurance processes that can monitor and protect virtual machine environments.

Yet another vulnerability in larger platforms implemented in virtual network computing systems is that providers may multiplex execution of virtual machines from potentially different customers on the same physical server. Applications that are deployed on such guest virtual machines remain susceptible to attacks that are similar to their non-virtual counterparts. Therefore, the security of computer systems really depends on the quality of the underlying software kernel that controls the confinement and execution of such virtual machines.

Virtual machine monitors or hypervisors are typically designed to operate multiple virtual machines. Each hypervisor can typically host an operating system and related applications concurrently on a single host computer and function to isolate and maintain isolation between different guest virtual machines. Operations, such as input/output operations, need to be partitioned in such environments. The hypervisors are generally more robust and better suited for the functions they serve than the operating systems they interface with in such virtualized computing environments.

Multi-tenancy, an important feature in cloud computing, in which different instances of the software run on a common server and serve multiple client-organizations (tenants), is generally considered an important feature of virtual machine-based cloud infrastructures. However, such a feature, combined with the way physical resources are shared between guest virtual machines, can also give rise to new sources of threat. For example, malicious code may escape a virtual machine and interfere with the hypervisor or other guest virtual machines.

The disclosed system and method provide a service assurance agent that may become part of the underlying hardware or may be implemented at the software hypervisor layer that supports any such fortified software applications and/or operating systems. The system is designed to support a broad set of software applications having a common platform capability. The agent initially establishes normal parameters for operation of the software. The model operational parameters are associated with the software application operating optimally or at a predetermined integrity level on the computer network. The model operational parameters are associated with data resulting from various memory operations, various file system operations, various related I/O operations, any operations resulting from the system's interactions with other applications(s) and/or operating systems(s), and/or various virtual functions as the software application(s) interact(s) at the predetermined integrity level as the agent layer monitors or inspects the operations at infrastructure layers situated above the agent layer or even at the agent layer itself. The integrity levels are predetermined by, for example, ad hoc techniques as a function of model operational parameters already described above and also described in greater detail below.

A level of integrity is determined by selecting a set of model operational parameters. Different levels of assured integrity can be supported from trivial to complex, and this choice dictates the number and range of model operational parameters that are compared to the system while it is in operation. In the case where model operational parameters are predetermined, those parameters may be derived from theoretical analysis or as a preferred embodiment, as metadata output from a compiler or interpreter of the application to which the invention is applied. For example, a compiler that is given data declarations for an application that includes communications buffers can note the buffer data locations and sizes and that data can then be used directly as an operational parameter to the assurance agent. Later when the agent is monitoring the application for abhorrent behavior, it can detect the machine attempting to perform a read or write beyond the declared buffer space, and thereby detect a buffer overrun exploit and prevent (or allow) it's operation. Because the operation parameters can be determined various software abstractions and build on one another, the number of operational parameters is very large, and it is likely that a basic set would be used to determine the integrity of the application. For example, in the empirical case, the service assurance agent may note the memory locations from which the applications performs input and output operations and create operational parameters that describe these locations and the type of input and output performed along with frequency of those events. When the assurance agent changes its mode of operation from learning to enforcing, these model operational parameters are then tested for matches against those that occur in the running system. An input/output operation of a new type or from a new piece of code would become an exception that might indicate that the software has run a rare corner case or possibly been compromised and is now performing new functions. A similar method can be used to test for runtime exceptions. For example, the assurance agent might monitor the memory allocation system calls in order to determine a memory "leak" condition, or may monitor input/output frequency to determine whether a disc operating system (DOS) attack is in progress, either inbound or outbound.

Operational parameters can include basic details of system operation, like memory locations, code, data and stack segments, and I/O addresses. They can also include higher layer software abstractions, like system calls, common library calls, functions, objects, and frameworks. Parameters can also include heuristic data about the operation of the application, like how long does it run between crashes, is memory use elastic, and how does it relate to CPU or I/O intensity. Heuristics can also include frequency of system calls, type of system calls, processor state, semaphores, and other various aspects of running software applications readily apparent to the hardware running such a system.

The various operational parameters may include items, such as the size of code and data, stack and heap, the code locations that manipulate memory or perform I/O operations, and temporal rhythms of operation of the application. Such parameters are used by the agent to establish norms of operation for the system infrastructure while operating at an assured and/or predetermined level of integrity. Further examples of such operational parameters may include system calls, library calls, network details, processor state and peripheral state. The disclosed system and method permit deploying software that is less than perfect with greater confidence in its functioning and resiliency, as well as the ability to protect a system from various types of security or virus-type attacks, in part due to deployment of less than perfect software. It is desirable for many software deployment situations to include an assurance agent that can detect various software problems, such as memory leaks, natural software lockups, infiltration of attacking code, and new I/O operations from code segments that were not initially part of the established software operations. The agent can react to changes in normal operation in several ways by reporting, resetting, resuming or simply monitoring and noting deviations from established normal operations.

Embodiments disclosed herein describe a system and method for managing compromised or imperfect software, whether the software is initially compromised or imperfect, or the software is subject to later issues once under operation in a particular virtualized computing environment. In addition, in certain virtual machine monitor environments, the transition of a virtual machine between hypervisors on different host computers without halting the guest operating system can increase complexity of software and size and possibly add other areas of vulnerability to an attack. There are other scenarios and vulnerabilities in which such systems are susceptible to attack or malfunction.

FIG. 1 is an example of an embodiment of the architecture used in a system implementing a service assurance agent. An operating system (1) and application (2) are installed and/or instantiated in a virtual machine (9) which generally includes the following elements: a virtual storage (1), a virtual CPU (11), a virtual memory (12), a virtual video unit (14) and a virtual network (15), and other virtualized physical machine components known to one skilled in the art, all implemented in a virtualized infrastructure layer. The virtualized infrastructure layer entails software elements, such as hypervisor (6), virtual machines (9), virtual memory (12) and virtual network components (15) among other elements, which are used to realize the infrastructure the computing platform is established upon. The virtual machines (9) enable the execution of multiple isolated operating system instances on a single physical machine. Virtual machines are typically implemented with the use of a hypervisor layer (6). The hypervisor layer (6) is a software layer that operates between the virtual machines (9) and the physical machine (21). The physical machine (21) includes physical computing infrastructure elements, such as a physical storage (16), a CPU (17), a memory (18), a video unit (19) and a network (20), which form the physical hardware layer of the system.

The hypervisor layer (6) generally allocates resources to the virtual machines (9), such as main memory and other peripherals. Although this hypervisor layer (6) is typically a substantial piece of software code, even greater concerns are evident for applications and/or operating systems which are generally even more substantial than hypervisor code and, as a result, security concerns and bug reports are problematic when operating such substantial code in virtualized or even in non-virtualized infrastructures. Most virtualized platforms may include software-based switches or virtual switches (7) as part of the virtual environment to allow virtual machines on the same host to communicate more directly and efficiently. A possible effect of virtualized environments is the potential loss of separation of duties between existing administration roles in an organization. An agent may be implemented to remedy this potential loss of separation of duties if the user prefers the system configured as such for the intended user's purposes and functions in implementing the particular system.

The agent (8) is implemented in the disclosed embodiment to interface with access to an optionally separated policy function (3), system assurance function (SAF) (4) and management function (5) in such virtualized environments in an administrative role. In some embodiments, the SAF (4) is hosted on a separate management system (5) virtual machine that may support a plurality of agents running in a plurality of hypervisors (6). Furthermore, it's possible that the policy (3) that determines the reaction to exceptions from the SAF (4) may be embodied in the same or in different management systems (5).

The agent (8) may generate empirical data and/or metadata, or such data may already be available from a prior instance of the application (2). Empirical data may also be generated by a compiler of the application (2) or even generated manually. The agent (8) collects such data about the application (2) and possible other applications running on the same infrastructure which are generally characterized by the application's (2) interactions through the operating system (1) with the virtual machine (9). This data includes interactions with various virtual subsystems, including but not limited to virtualized memory (12), virtualized CPU (11), virtualized storage (10), virtualized network (15), and virtualized video unit (14). This data characterizes one or more operational parameter(s) associated with a software application operating at a maximum or predetermined integrity level on the computer network. The operational parameter is associated with data resulting from various file system operations, memory operations, I/O operations, various operations with other operating systems and other virtual functions, as the software application(s) and/or operating system(s) interact(s) at the predetermined integrity level as the agent layer monitors or inspects the operations of infrastructure layers situated above the agent layer or even at the agent layer itself.

Examples of operational parameters collected and later used by the agent (8) in performing related system assurance functions include any data associated with file system operations including files read, files that are written, code segments that perform I/O operations, and typical I/O characteristics stemming from such functions. Examples of additional operational parameters collected by the agent may include data associated with memory operations, such as memory allocations, release, stack, heap, frequency and duration of access (read and write operations) to code and other data segments. The agent (8) continually monitors these model operational parameters to determine if there is a current operation that forms an exception to previously determined model operational parameters when the system and related applications are operating at or even what is considered operable or assured integrity levels.

The system assurance function (SAF) (4) may utilize the raw data or operational parameters and develop a parameterized model to describe the operation of the application at an efficient level. In one embodiment of the disclosed technology, this function will heuristically develop a model of the system operating at predetermined integrity levels or operable integrity levels. In such a mode, the model operational parameters that are determined by the agent to be indicative of the system operating at predetermined or operable integrity levels, are subsequently tailored and redefined as events that trigger an exception to the policy function (3). A determination of a usable model that is later tailored or redefined can be set or triggered by the policy function (3). Once a usable model is set or triggered by the policy function (3), the system assurance function (SAF) (4) no longer learns behavior, but rather monitors behavior.

In one embodiment, the SAF (4) will provide the usable operating model to the agent (8) to redefine or set the model operational parameters for the system. The agent (8) may compare the model operational parameters to the operational model either sporadically or continually to determine whether there is an exception to the current operational parameters. Once there is determined to be a deviation from the model as compared to current operational parameters or characteristics of the system, an exception is indicated. Once an exception is determined, the agent (8) sends an instruction to the policy function (3) for resolution or simply notes the occurrence of the exception for learning purposes or later analytics.

In yet another embodiment, the system assurance function (4) continues to collect current operational characteristics of the system. The SAF (4) monitors the operational characteristics and compares such data against the operating model or operational parameters. The SAF (4) indicates a policy exception to the policy function (3) once it determines there is a deviation from the operating model. The policy function (3) processes the exception and determines the proper remedy for the system operating at less than predetermined integrity levels.

It is expected that the course of action to be taken when applications deviate from their model operational parameters might vary a great deal. People who make use of applications have different concerns. For example, the concerns for a user running an application with no network connectivity might be more attuned to determining application faults, memory leaks, and unexpected operating conditions. Another user running an application that performs Internet commerce might be much more concerned with aberrations that might indicate hacking or compromise. Because the expected responses to exceptions from the SAF (4) are so broad, the preferred embodiment of a resolution agent is through policy control. In one embodiment, the SAF (4) presents exceptions to a policy function, and that policy function can take a broad scope of actions based on one or more exceptions. Taking on the nature of policy control systems, the possible exceptions are expressed in high level business language or logic that facilitates the end user to script, write, and/or express their desired approach to resolving the exception. Typical actions that such a policy system might take include, but are not limited to: stopping or restarting the application; taking or reverting to a virtual machine snapshot; logging the exception; running other applications; and modifying the operating model in whole or in part.

Figure 2:
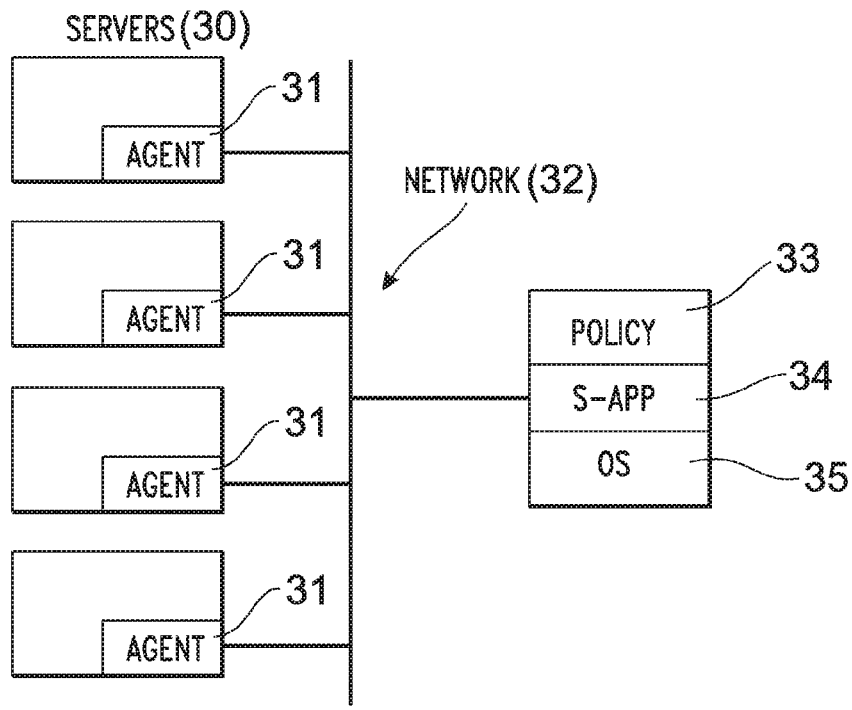
FIG. 2 is a block diagram of distributed software architecture in an exemplary embodiment.

FIG. 2 is an embodiment with a system configuration having several servers (30) connected to a network (32). Each server includes a system assurance agent (31) that generates operating model exceptions to the policy function (33). In one embodiment, the SAF (4) provides a usable operating model to agent (31) to compare against the model operational parameters for the system. The agent (31) may compare the model operational parameters to the operational model associated with the application performing at the predetermined integrity level. Such comparison is either sporadically or continually to determine whether there is an exception to the model operational parameters. Once there is determined to be a deviation from the operational model as compared to current operational characteristics of the system, an exception is indicated. Once an exception is determined, the agent (31) will send an indication to the SAF (4) which may modify the operational model (typically when in learning mode) or may inform the policy function (33) for resolution or to simply note the occurrence of the exception.

In yet another embodiment, the system assurance function, or in some embodiments, the system assurance application (34) may continue to collect current operational characteristics of the system. The SAF (4, 34) can monitor the operational characteristics and compare such data against the operating model or model operational parameters. The SAF (4,34) may indicate a policy exception to the policy function (33) once it determines there is a deviation from the parameterized operating model. The policy function (33) can process the exception and determine the proper remedy for the system operating at less than a predetermined integrity level. It should be noted that the operating system (OS) (35) may perform function similar to the management functions of MGT (5) as shown in FIG. 1.

Figure 3:
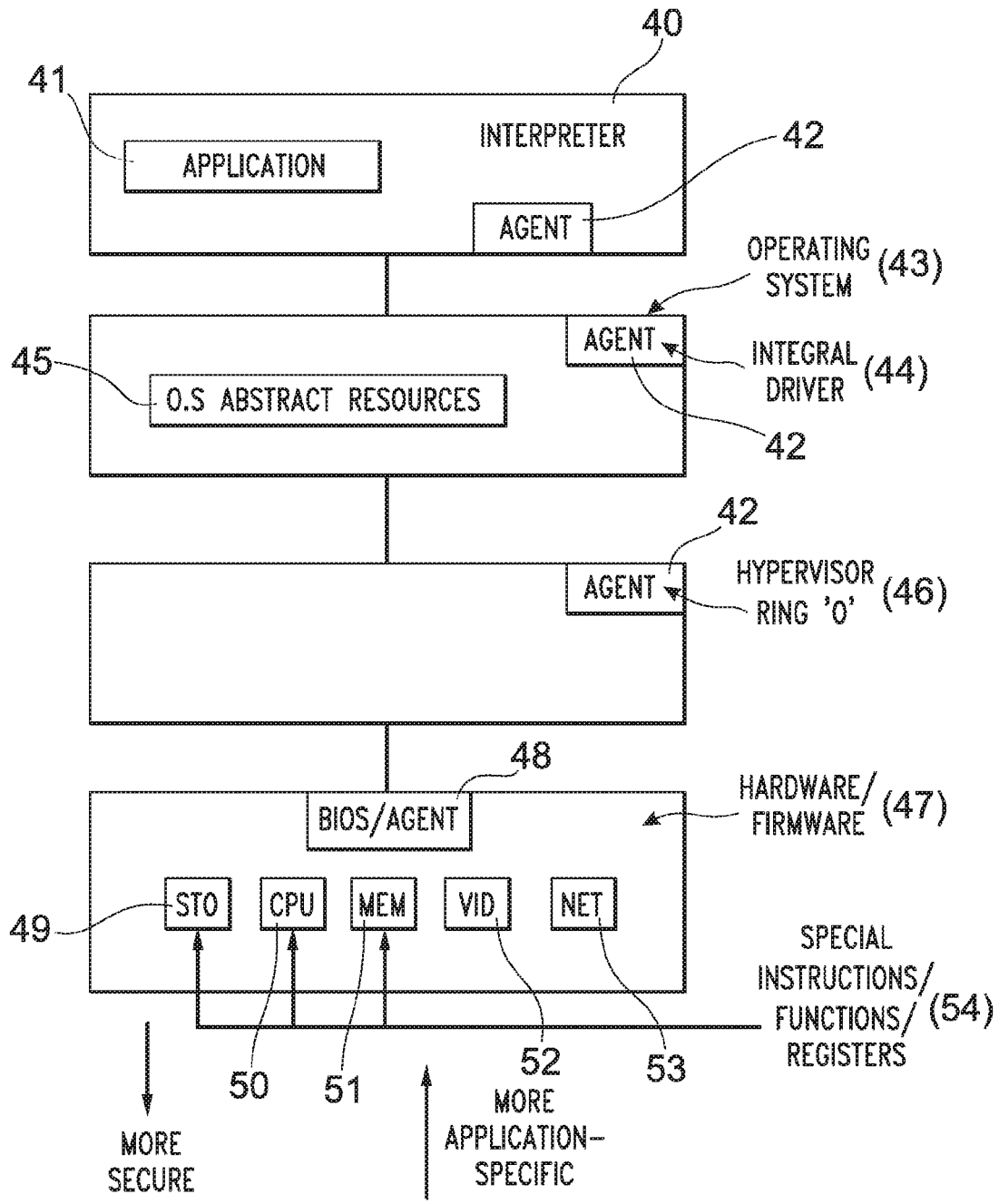
FIG. 3 is a block diagram of an alternative embodiment of a system assurance agent.

Another embodiment as shown in FIG. 3 shows the agent functioning at various levels of software and hardware abstractions. The system may include an application (41) running in an interpreter (40) or that has been compiled to include runtime libraries. An interpreter (40) directly executes the instructions for the application without previously batch-compiling them into machine language. An interpreter generally uses one of the following strategies for program execution: parsing the source code and performing its functions directly; translating source code into some efficient intermediate level and immediately executing such instructions; or directly executing stored precompiled code generated by a compiler that is part of the interpreter system. The agent (42) may be embedded into this level of infrastructure with different layers of software abstraction shown in FIG. 3 from the top level application layer (40) to the lowest level (47). Similarly, an application may be compiled using libraries, frameworks, and application APIs that allow insertion of an agent (42) through the compilation process, or though the linking or dynamic linking with libraries, frameworks, or other applications. In both of these cases, the agent (42) may become aware of higher layer abstractions revealed by the source code of the application. For example, the agent (42) may learn that a memory location is a pointer or buffer, or it may learn which code segments perform network operations, and which types are desired.

In some embodiments, the BIOS/agent (48) at a hardware/firmware topology layer (47) adds additional capabilities to the hardware than prior known systems to permit the hardware to measure, set and generate interrupts to software operations based on functions that facilitate monitoring the behavior of the software running on the system. For example, when a memory cache misses, or the program counter reaches memory marked as a data segment, the hardware may be interrupted and run a diagnostic. Just above this layer (47), and in certain embodiments hosting the aforementioned software, is the basic input/output system (BIOS) shown as BIOS/agent (48) which can also help detect these events and log them. For example, a BIOS security feature may be included that supports an agent similar to that described as part of a hypervisor, but that runs as part of the machine firmware. Such an agent might be configured by a SAF embodied as described or as part of an orchestration system so that the basic machine configuration includes an operational model that describes operating parameters of virtual machines as well as the hypervisor, v-Switch, or an operating system that is running natively on the machine. If the hypervisor stops operating within the operating model, the firmware may stop or re-start the machine. This approach is likely to require special support from the hardware, but in practice, might be considered more secure. The next layer, the hypervisor layer (46) is the software layer of the hypervisor. The hypervisor operates at the most privileged security level of machine code execution (Ring O) and is positioned to see the interaction between a virtual machine and the underlying hardware. This software agent (42) is case described in this application and is considered the preferred embodiment when a single agent (42) is use. Typically within the virtual machine, there lies an operating system that takes the system resources and abstracts them to applications and frameworks in terms of files, volumes, virtual memory, buffers, sockets, and the like. Software drivers (44), such as integral driver (44) can be added to the operating system (43) so that the agent (42) learns about the operating system's abstract resources (45) and other abstractions instead of (or in addition to) the hardware abstraction provided by the hypervisor layer (46).

Located above the operating system (43) layer are interpreters (40) and software frameworks. Agent software (42) can once again be implemented at this layer of abstraction in order to assure integrity and security in the system. An example is a compiler framework. An application (41) is compiled and is more deeply analyzed by the compiler. It is typically a less complicated matter for such a process to create some additional meta-data about the compilation of that application with the typical executable data. Such meta-data can identify the intended points in the application where memory is allocated, I/O is performed and the system calls that are made during the application's operations. At this level of abstraction, it is possible that less learning is needed about the intended behavior of the application and more can be directly declared from its actual source code. The meta-data can then be used by run-time libraries or capabilities in the operating system (43) that can detect anomalies and exceptions thereto. Also, a much broader set of tests and behaviors can be supported. The source code declares data, and the interpreter (40) can determine whether the application operated on un-initialized data, read beyond a buffer, or simply called a method inappropriate to a particular object. A fair amount of this static checking typically occurs in compilers and interpreters. However, what is generally not known is that these compilers and interpreters do not learn or gather run-time information from merely monitoring the application during its operations and related processing. The learning models are formed by the agent (42) via the learning models that the compilers and interpreters (40) generate, and then such learned behavior can be enforced by monitoring and assuring that the system and related application behave within the learned parameterized model.

Typically, a consequence of such a chain of abstractions (as you view the system from the hardware/firmware layer (47) moving up towards the application and interpreter layer (40)) is that less is protected and known about the overall environment at the top application layer (41). For example, an agent at the hypervisor level (46) may be able to see and monitor all the virtual machines that run within a physical system (47). However, at the operating system layer (42), security attacks that are outside or below the operating system in terms of topology layers, may not be detected. By contrast, at the application, interpreter, or framework layers, other applications or the operating system itself would not be protected from attacks. Therefore, the agents (42) that are generally an additional software module to hypervisor layers, can provide more security. There is necessarily, by virtue of computer topology and related functioning, greater protection afforded at lower levels of abstraction, since the agents (42) situated at the hardware/firmware layer (47) generally have more learning at that level of abstraction. By contrast, more specialized integrity protections are provided at the higher topological layers such as at the application (41) or operating system (43) layers which are considered higher level computing layers from a topographical computing viewpoint.

In certain embodiments, systems can also be configured to include these agents at multiple layers in order to be both secure and create greater efficiencies in functioning and in resource allocations at both the higher application and operating system layers as well as at the hardware/firmware and hypervisor layers.

Figure 4:
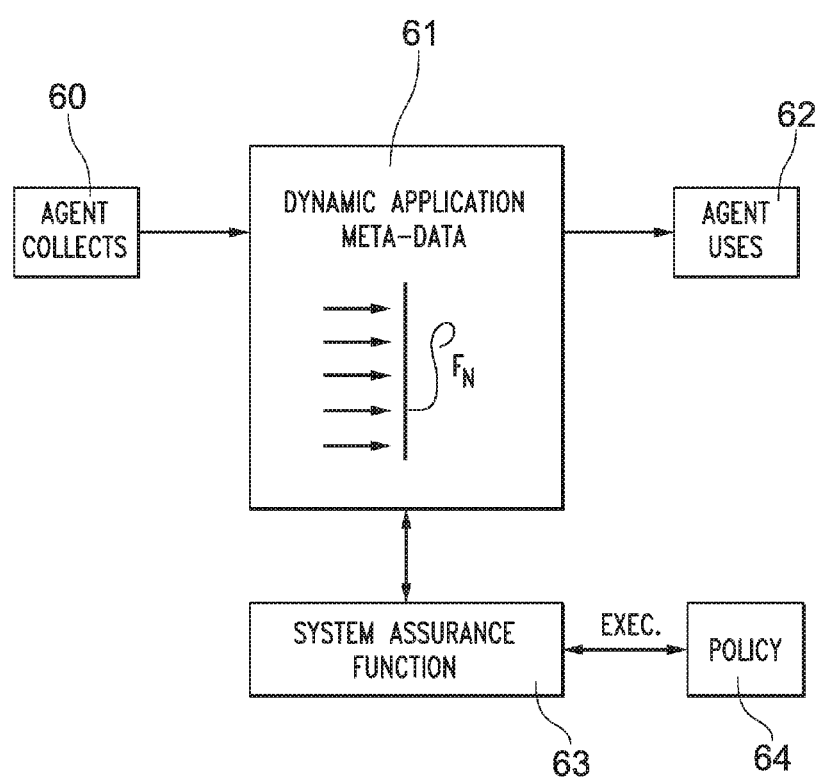
FIG. 4 is a block diagram illustrating independent operations of the system assurance agent.

FIG. 4 is a block diagram of a flow chart describing an alternative embodiment of a system assurance agent implemented in a network environment or other computing infrastructure including i-cloud or similar network environments. In the disclosed embodiment, the system assurance function at step (63) may be configured to react to exceptions that are delivered to the policy function at step (64). The agent at step (60) may collect various dynamic application meta-data that relates to the application's operations as it interacts with the system through an operating system.

The agent at step (60) may collect empirical data or such data that may be available from a current instance of the application. The agent at step (60) collects data about the application and possible other applications running on the same infrastructure that are generally characterized by the application's interactions through the operating system with the system's particular infrastructure, such as virtual machine(s). This meta-data includes interactions with various virtual subsystems, including but not limited to virtualized memory, virtualized CPU, virtualized storage, virtualized network, and virtualized video. This meta-data characterizes one or more model operational parameters associated with a software application operating at a predetermined integrity level on the computer network, the operational parameter being associated with data generated by a file system operation or a memory operation as the software application interacts at a maximum or predetermined integrity level or an operable integrity level with a virtual machine or physical machine using an operating system.

Examples of model operational parameters collected in step (61) and later used by the agent as shown in step (62) in performing related system assurance functions, include meta-data related to file system operations including files read, files that are written, code segments that perform input and output operations (I/O), and typical I/O characteristics. Examples of additional model operational parameters collected by the agent in step (61), may include meta-data related to memory operations such as memory allocations, release, stack, heap, frequency and duration of access (read and write operations) to code and other data segments. The agent (60) will continually monitor these model operational parameters to determine if there is a current operation which forms an exception to previously determined model operational parameters while the system and related applications are operating at predetermined integrity levels.

The system assurance function (SAF) (63) may utilize the meta-data collected in step (61) or other model operational parameters and develop a parameterized operational model to describe the predetermined integrity level of operation of the software application. The system assurance function (63) analyzes raw data inputs. The system may develop, via a heuristic-type model, a determination of operation parameters. Upon determination of a learned state, the SAF (63) may further modify the current parameterized model at which the system operates at integrity levels, a level of maximum integrity or a predetermined level of integrity established during operations as an achievable goal of efficient operations. Such maximum integrity levels are determined by, for example, ad hoc techniques as a function of model operational parameters described above.

In an embodiment of the disclosed technology, this function will heuristically develop a model of the system operating at maximum integrity levels or predetermined integrity levels. In such mode, the model operational parameters that are determined by the agent to be indicative of the system operating at predetermined integrity levels, are subsequently tailored and redefined as events trigger an exception to the policy function (64). A determination of a usable model that is later tailored or redefined can be set or triggered by the policy function (64) as the system assurance function (63) analyzes the model operational parameters and operational characteristics of the application as it runs through the operating system. Once a usable model is set or triggered by the system assurance function (63), the system assurance function (SAF) (63) no longer learns behavior by analyzing the dynamic application meta-data (61) and no longer is forming a parameterized model as the system is now launched into a learned state in which it may then monitor and learn the current operational parameters of the system.

The system assurance function (63) is next launched into a monitoring state in which it now instructs the agent to compare current operational parameters to the operational model it has established. The agent (62) now monitors behavior as the application interfaces with the infrastructure through the operating system. The agent (62) may alert the system assurance function (63) which may generate exceptions to the policy function (64) when it determines that an exception associated with the current operational model has occurred. An exception can be determined in some embodiments by detecting current operational characteristics or parameters associated with the software application operating at a current integrity level on the computer network. The current operational characteristics are associated with data resulting from various file system operations, memory operations, I/O operations, various operations with other operating systems and other virtual functions as the software application(s) and/or operating system currently interact(s) at the predetermined integrity level as the agent layer monitors or inspects the current operations of infrastructure layers situated above the agent layer or even at the agent layer itself. The system assurance function (63) will detect an exception associated with the current operational parameters by comparing the model operational parameters and the current operational parameters through the above-described methods of analyzing the dynamic application meta-data (61) of the system that form the model operational parameters which form the basis for the parameterized model of the system once the system launches into a learned state of operation.

The policy function at step (64) may, upon the delivery of an instruction from the system assurance function (63) that an exception has occurred, analyze the exception and take the proper action to remedy the exception. Alternatively, during the policy function (64) step, the system may take note of the exception and use the event to launch the system into a learning state where it can reconfigure the parameterized model including the model operational parameters associated with the parameterized model.

One of the indicated actions the system may take to remedy an exception is for example, in the event a memory leak exception is detected, the system may reconfigure the memory allocations to recapture the lost data and restore to the same functioning level prior to such memory leak. Yet another example is in the event of a natural software lockup exception, the system will have already taken provisions to capture all the system meta-data, memory allocations, file allocations, I/O operations, to restore the system to the same functioning level prior to the software lockup without any noticeable interruptions to the user of the application(s) during operations. The system will have provisioned for such software lockup(s) in advance of the actual event so that upon delivery of an exception report, the system will generate what is similar to a re-boot or re-setting of the system but, this modified form of re-boot only occurs in a virtual layer that shields the remaining virtualized hardware and physical hardware from any interruption in processing, so that seamless processing occurs to the end-user of the software application(s) and the related infrastructure the application(s) operate(s) on.

The system may also detect infiltration of attacking code as it responds to a detected exception to the parameterized operating model. The system will instantaneously block the infiltrating code from any further system changes, submit an exception from the system assurance function (63) to the policy function (64) and reset the system operations. Similar to the instance of a software lockup, the policy function (64) resets the system operations and also, blocks any further activity by the attacking code to render it defenseless in its mechanisms. In certain embodiments, the system will generate a virtual layer dedicated to the attacking code such that it cannot operate outside the boundaries of such virtual layer. Various boundaries are designated for the virtual layer such that no memory operations, file operations or any other I/O operations can be performed by such attacking code on the actual system's infrastructure including its designated virtual machines, physical machines, operating system and any corresponding agent, system assurance functions, and policy functions associated with the disclosed system's SAF layer and related processes.

The policy may allow for resets, destruction of the VM and re-initialization of the VM, and for various judgments (business logic) that determine what constitutes an attack and/or an exploit, and what to do about it.

The system may also detect input/output operations from code segments that may be the result of malicious or infiltrating attacking code. Alternatively, such code segments may be the result of code segments that include unresolved bugs or code segments that have become corrupt during processing. The system generates an exception to the parameterized operating model, upon detection of input/output operations resulting from code segments that function outside the established parameterized model including its associated model operational parameters. The system analyzes current operational characteristics associated with the software application operating at a current integrity level on the computer infrastructure including characteristics resulting from I/O operations, file system operations and/or memory operations. The system, similar to the scenario of attacking code, will instantaneously block the infiltrating or corrupt code segments from any further system operations, submit an exception from the system assurance function (63) to the policy function (64) and reset the system operations similar to the instance of a software lockup except, the system blocks any further activity by the attacking code, bug-ridden code or corrupt code segments, to render such code defenseless in its mechanisms and related functionality. In certain embodiments, the system will generate a virtual layer dedicated to the code segments such that they cannot operate outside the boundaries of such virtual layer. Various boundaries are designated for the virtual layer such that no memory operations, file operations or any other I/O operations can be performed by such attacking code on the actual system's infrastructure including its designated virtual machines, physical machines, sub-virtual machines and any corresponding agent, system assurance functions, policy functions associated with the disclosed system assurance layer.

There may be many possible configurations and examples, for handling exceptions and especially variations of re-starting the application (not the entire machine) if it's believed that the code was simply faulty, and did not affect operating system stability.

The system assurance function (SAF) (63) or the agent (62), depending on the embodiment, may compare the operational data or the current operational characteristics data associated with the software application(s) operating at a current integrity level on the computer network, and generate exceptions or events to the policy function. The learning mode for the SAF or agent layer might simply be a policy where the events are used to refine or recalculate the operating model and, when a change occurs and events stop occurring, the model may be considered moot for operation for a certain time period. Hence, a different operating model may be designated by the system as appropriate for the current operational state of the system and its related operational characteristics. Once the operating model is instituted, the policy function receives events that represent any aberrational system behavior. The policy permits the operator-defined responses to be handled flexibly as well. The simplest default policy is to re-start the application without the physical appearance of a re-set to the end-user as it would appear to the user as a seamless continuous use of the application. While in the policy layer, the system instantaneously intervenes to re-set the parameters to the settings reflecting the operational characteristics just prior to the aberrational event so the operation(s) of each application appear functionally to progress in real-time. However, the program may actually be functioning in a temporary delay in time and then re-set back to the present time as it reaches its normal operations with respect to the present time. The system may also conceivably function on a slight time delay so as to avoid any interruptions to operations and any visibility of a re-set to the end user until the system actually is reset by the end-user.

Another embodiment permits for policy events to be abstracted. At a more fundamental level, a policy event may simply be for example, that the operating data does not fit the parameterized model. However, the SAF may enrich (abstract) such an event to provide context or generalization. For example, a low-level policy event may indicate a memory fetch outside a set of limits. A next-higher abstraction may be a memory allocation (malloc) request beyond typical amounts. A next-higher abstraction may be a stack or buffer that has outgrown typical operation. By permitting the system to provide details and abstractions, the policy function can react differently and accordingly based on the disparate events that may occur. For example, applications that exhibit growing stacks or heaps (memory leaks) may be forgiven until such time that the overall system memory limits are nearly reached, and then re-started. In such scenarios, an application with a design flaw can be made more robust by re-setting it before the flaw causes the system to crash eventually. The same application that may generate an exception might not be re-started but rather re-imaged and re-networked to include an intrusion detection system (IDS). An IDS generally monitors network or system activities for malicious attacks or policy violations and may produce reports to a management station such as a SAF or an agent. Some systems may attempt to block an intrusion as well. Intrusion detection and prevention systems (IDPS) are primarily focused on identifying possible incidents, logging information about them, and reporting attempts which would generate reports to the SAF or agent.

Similar resolutions can be applied to problems like lock-ups, hardware faults, triggering scale-out, and similar problems.

In yet another embodiment, the system supports an application programming interface (API) which allows a protected or monitored application to interact with the agent more stringently, which is similar to watchdog timers currently practiced in the art.

In such an embodiment, an application may express model operational parameters or even parts-of or an entire operational model to the agent. This might strengthen the protection that can be afforded by the agent and improve upon an operational model that might have be deduced heuristically. For example, and application might express to the agent, using an API, which files it needs to write or modify in the file system, and which network protocols it needs to perform its tasks. Instead of learning, or in addition to learning these and other operating parameters, the agent can then pass such data to the SAF, which can incorporate these aspects into the operational model. Given the operational model, the agent may then ensure that the application adheres to the operational model, and exceptions from faulty or maliciously inserted code may be handled by the agent.

In another embodiment, the system handles the monitoring of multiple instances of applications running through an operating system including different applications operating in the same infrastructure. Multiple agents can be provisioned as required for monitoring multiple instances of one or more kinds of software applications in various configurations of virtualized and/or physical computing infrastructure including networks and/or iCloud environments. One of the advantages of such an embodiment is that the same system assurance agent solution can be applied to many applications without having to be customized for each different application that operates in the system.

Figure 5:
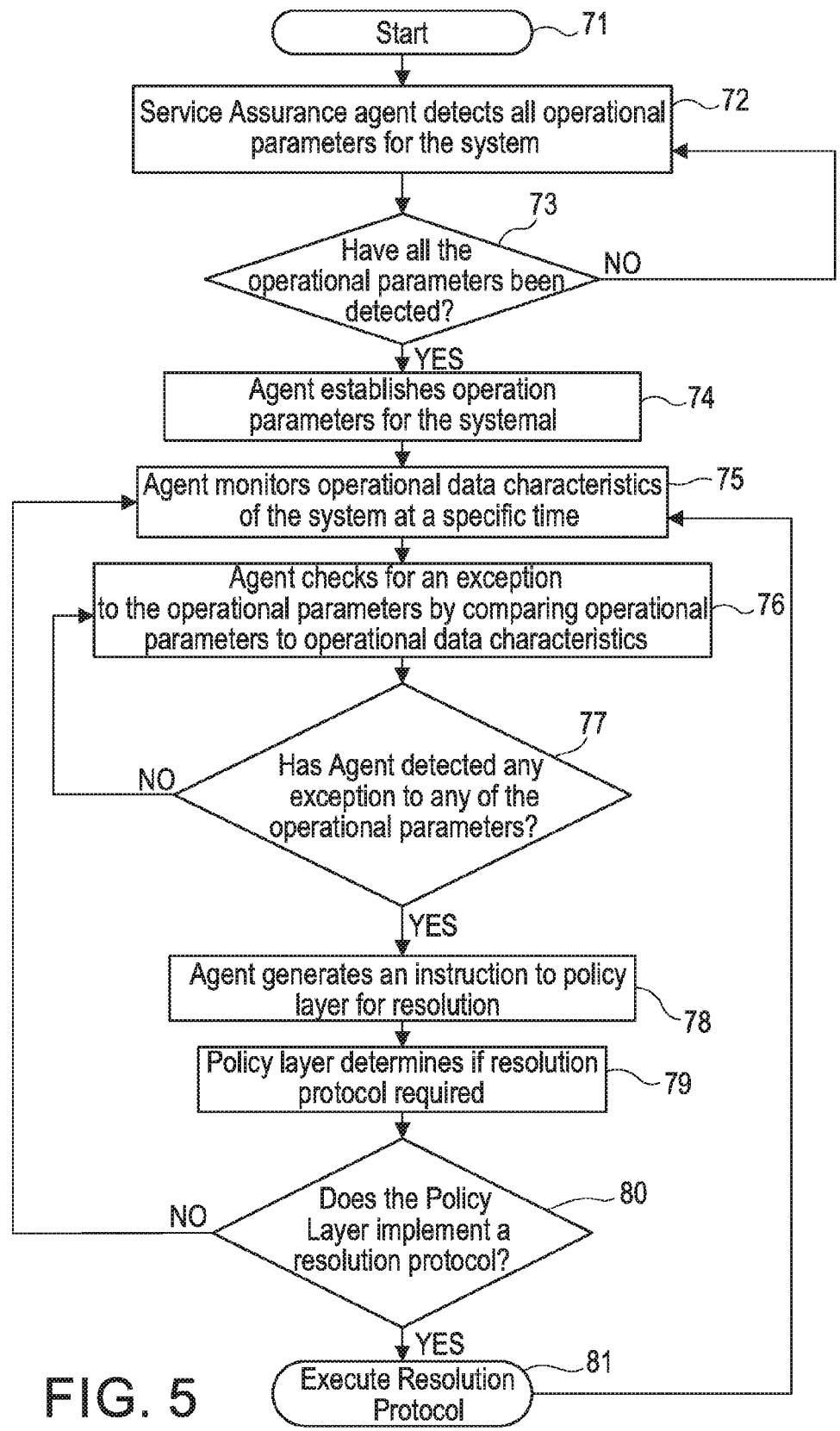
FIG. 5 is an illustration of a flowchart that demonstrates an example method of the service assurance agent implementing its related processes.

As shown in FIG. 5, the service assurance agent detects all normal operation parameters for the system in step (72) upon commencement of the system (71) operations. At step (73), the system may check whether all the operational parameters have been detected for the system including parameters associated with any file system operations and memory operations, and any other I/O operations. If additional parameters exist and have not yet been detected, the system will re-route to step (72) in detecting again all operational parameters while the system is functioning at predetermined integrity levels or operable integrity levels. An integrity level may be predetermined during operations as an achievable goal of efficient operations. Once all the operational parameters have been detected, the Agent will next establish at step (74) the model operational parameters and, in some embodiments, store a parameterized model during such system's efficient operations. The agent at step (75) monitors current operational data characteristics by comparing the stored operational parameters with the detected current operational characteristics or current parameters associated with the same model operational parameters. The agent at step (76) checks for an exception to the model operational parameters by comparison of the stored model operational parameters to the detected operational data characteristics or current parameters of the software application as currently operating on the computer network. Such operational data characteristics may be associated with any data or meta-data resulting from file system operations and/or memory operations as the software application currently interacts through an operating system with a virtual machine or as the infrastructure is configured. Once an exception to the model operational parameters is detected at step (77), the agent will next generate an instruction to the policy layer for resolution at step (78). The policy layer will next determine if a resolution protocol is required at step (79) or only a simple noting and recording of the exception may be necessary at this juncture. If no resolution is deemed necessary, the system will generate a signal to the agent to monitor the operational data characteristics of the system at step (75). The policy layer next implements a resolution protocol if deemed necessary to resolve the exception at step (80) and once resolved goes back to monitoring the operational characteristics at step (75).

Figure 6:
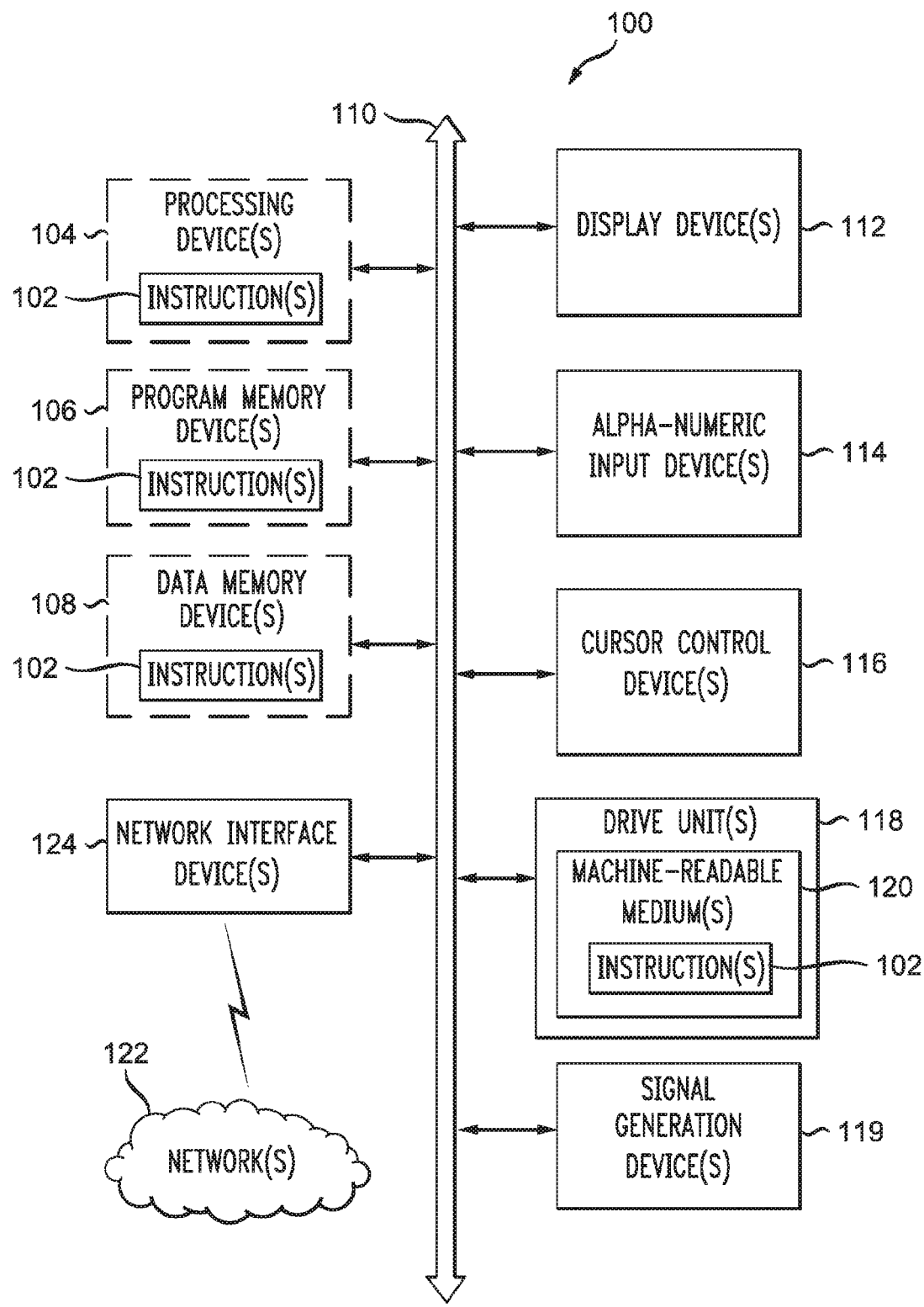
FIG. 6 is a block diagram showing a portion of an exemplary machine in the form of a computing system configured to perform methods according to one or more embodiments.

FIG. 6 is a block diagram of an embodiment of a machine in the form of a computing system 100, within which a set of instructions 102 is stored, that when executed, causes the machine to perform any one or more of the methodologies disclosed herein. In some embodiments, the machine operates as a standalone device. In some embodiments, the machine may be connected (e.g., using a network) to other machines. In a networked implementation, the machine may operate in the capacity of a server or a client user machine in a server-client user network environment. The machine may comprise a server computer, a client user computer, a personal computer (PC), a tablet PC, a personal digital assistant (PDA), a cellular telephone, a mobile device, a palmtop computer, a laptop computer, a desktop computer, a communication device, a personal trusted device, a web appliance, a network router, a switch or bridge, or any machine capable of executing a set of instructions (sequential or otherwise) that specify actions to be taken by that machine.

The computing system 100 may include a processing device(s) 104 (e.g., a central processing unit (CPU), a graphics processing unit (GPU), or both), program memory device(s) 106, and data memory device(s) 108, which communicate with each other via a bus 110. The computing system 100 may further include display device(s) 112 (e.g., liquid crystals display (LCD), a flat panel, a solid state display, or a cathode ray tube (CRT)). The computing system 100 may include input device(s) 146 (e.g., a keyboard), cursor control device(s) 116 (e.g., a mouse), disk drive unit(s) 118, signal generation device(s) 119 (e.g., a speaker or remote control), and network interface device(s) 124.

The disk drive unit(s) 118 may include machine-readable medium(s) 120, on which is stored one or more sets of instructions 102 (e.g., software) embodying any one or more of the methodologies or functions disclosed herein, including those methods illustrated herein. The instructions 81 may also reside, completely or at least partially, within the program memory device(s) 106, the data memory device(s) 108, and/or within the processing device(s) 104 during execution thereof by the computing system 100. The program memory device(s) 106 and the processing device(s) 104 may also constitute machine-readable media. Dedicated hardware implementations, not limited to application specific integrated circuits, programmable logic arrays, and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present embodiment contemplates a machine-readable medium or computer-readable medium containing instructions 102, or that which receives and executes instructions 102 from a propagated signal so that a device connected to a network environment 122 can send or receive voice, video or data, and to communicate over the network 122 using the instructions 102. The instructions 102 may further be transmitted or received over a network 122 via the network interface device(s) 124. The machine-readable medium may also contain a data structure for storing data useful in providing a functional relationship between the data and a machine or computer in an illustrative embodiment of the disclosed systems and methods.

While the machine-readable medium 120 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform anyone or more of the methodologies of the present embodiment. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the embodiment is considered to include anyone or more of a tangible machine-readable medium or a tangible distribution medium, as listed herein and including art-recognized equivalents and successor media, in which the software implementations herein are stored.

Although the present specification describes components and functions implemented in the embodiments with reference to particular standards and protocols, the disclosed embodiment are not limited to such standards and protocols.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "embodiment" merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 31 C.F.R. §1.12(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

In a particular non-limiting, example embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods, functions or logic described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods, functions or logic described herein.

It should also be noted that software which implements the disclosed methods, functions or logic may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although specific example embodiments have been described, it will be evident that various modifications and changes may be made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "embodiment" merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

Although preferred embodiments have been described herein with reference to the accompanying drawings, it is to be understood that the disclosure is not limited to those precise embodiments and that various other changes and modifications may be affected herein by one skilled in the art without departing from the scope or spirit of the embodiments, and that it is intended to claim all such changes and modifications that fall within the scope of this disclosure.

What is claimed is:

1. A method of increasing integrity associated with a network computing system including a hypervisor, the method comprising:

determining, using a processing device associated with an agent function supported by an agent layer of the computing system, a set of model operational parameters associated with an application operating at a predetermined integrity level on the network computing system, the set of model operational parameters being associated with operation of a layer above the agent layer as the application operates at the predetermined integrity level and interacts with the layer above the agent layer, wherein the set of model operational parameters comprises memory locations from which the application performs input and output operations, buffer data locations and sizes, elasticity of memory use, frequency of system calls, type of system calls, processor state and semaphores;

generating, using the processing device, an operational model associated with the application performing at the predetermined integrity level as the application interacts with the hypervisor, the agent layer using the operational model to monitor the computer network including the hypervisor, the hypervisor being associated with efficient allocation of network resources to a virtual device;

detecting, using the processing device, a current operational parameter associated with the application operating at a current integrity level on the computer network, the current operational parameter being associated with operation of the layer above the agent layer as the application operates at a current integrity level and interacts with the layer above the agent layer;

determining, using the processing device, an exception associated with the operational model based on a comparison between the set of model operational parameters and the current operational parameter; and generating, using the processing device, an instruction from the agent layer to resolve the exception, the instruction including a modification to the operational model, the instruction redefining the predetermined integrity level, thereby increasing integrity of the computer network.

2. The method, as defined by claim 1, wherein the set of model operational parameters is associated with operation of an operating system as the operating system interacts with a hypervisor layer at the predetermined integrity level.

3. The method, as defined by claim 1, wherein the set of model operational parameters is associated with operation of an operating system as the operating system interacts with a virtual machine at the predetermined integrity level.

4. The method, as defined by claim 1, further comprising modifying the set of model operational parameters in response to the instruction to resolve the exception and increase the integrity of the computer network.

5. The method, as defined by claim 1, further comprising modifying the operational model in response to the exception.

6. The method, as defined by claim 1, wherein the current operational parameter is associated with operation of the operating system as the operating system currently interacts with a hypervisor layer at the current integrity level.

7. The method, as defined by claim 1, wherein the current operational parameter is associated with operation of the operating system as the operating system currently interacts with a virtual machine at the current integrity level.

8. The method, as defined by claim 1, wherein the set of model operational parameters is associated with operation of the application as the application interacts with a hypervisor layer at the predetermined integrity level.

9. The method, as defined by claim 1, wherein the set of model operational parameters is associated with operation of the application as the application interacts with a virtual machine at the predetermined integrity level.

10. A system to increase integrity of a computer network including a hypervisor, the system comprising:
a processing device associated with an agent function and supported by an agent layer of a computing system; and
a storage device storing instructions that, when executed by the processing device, perform operations comprising:
determining a set of model operational parameters associated with an application operating at a predetermined integrity level on the network computer system, the set of model operational parameters being associated with operation of a layer above the agent layer as the application operates at the predetermined integrity level and interacts with the layer above the agent layer, wherein the set of model operational parameters comprises memory locations from which the application performs input and output operations, buffer data locations and sizes, elasticity of memory use, frequency of system calls, type of system calls, processor state and semaphores;
generating an operational model associated with the application performing at the predetermined integrity level as the application interacts with the hypervisor, the agent layer using the operational model to monitor the computer network including the hypervisor, the hypervisor being associated with efficient allocation of network resources to a virtual device;
detecting a current operational parameter associated with the application operating at a current integrity level on the computer network, the current operational parameter being associated with operation of the layer above the agent layer as the application operates at the current integrity level and interacts with the layer above the agent layer;
determining an exception associated with the operational model based on a comparison between the set of model operational parameters and the current operational parameter; and
generating an instruction from the agent layer to resolve the exception, the instruction including a modification to the operational model, the instruction redefining the predetermined integrity level, thereby increasing the integrity of the computer network.

11. The system as defined by claim 10, wherein the set of model operational parameters is associated with operation of an operating system as the operating system interacts with a hypervisor layer at the predetermined integrity level.

12. The system as defined by claim 10, wherein the set of model operational parameters is associated with operation of an operating system as the operating system interacts with a virtual machine at the predetermined integrity level.

13. The system, as defined by claim 10, wherein the operations further comprise modifying the set of model operational parameters in response to the instruction to resolve the exception and increase the integrity of the computer network.

14. The system, as defined by claim 10, wherein the operations further comprise modifying the operational model in response to the exception.

15. The system, as defined by claim 10, wherein the current operational parameter is associated with operation of the operating system as the operating system currently interacts with a hypervisor layer at the current integrity level.

16. The system, as defined by claim 10, wherein the current operational parameter is associated with operation of the operating system as the operating system currently interacts with a virtual machine at the current integrity level.

17. The system, as defined by claim 10, wherein the set of model operational parameters is associated with operation of the application as the application interacts with a hypervisor layer at the predetermined integrity level.

18. The system, as defined by claim 10, wherein the set of model operational parameters is associated with operation of the application as the application interacts with a virtual machine at the predetermined integrity level.

19. A computer-readable device storing instructions that, when executed by a processing device associated with an agent function and supported by an agent layer of a computing system, cause the processing device to perform operations to increase integrity of a computer network including a hypervisor, the operations comprising:
determining a set of model operational parameters associated with an application operating at a predetermined integrity level on the computer network, the set of model operational parameters being associated with operation of a layer above the agent layer as the application operates at the predetermined integrity level and interacts with the layer above the agent layer, wherein the set of model operational parameters comprises memory locations from which the application performs input and output operations, buffer data locations and sizes, elasticity of memory use, frequency of system calls, type of system calls, processor state and semaphores;
generating an operational model associated with the application performing at the predetermined integrity level as the application interacts with the hypervisor, the agent layer using the operational model to monitor the computer network including the hypervisor, the hypervisor being associated with efficient allocation of network resources to a virtual device;
detecting a current operational parameter associated with the application operating at a current integrity level on the computer network, the current operational parameter being associated with operation of the layer above the agent layer as the application operates at the current integrity level and interacts with the layer above the agent layer;
determining an exception associated with the operational model based on a comparison between the set of model operational parameters and the current operational parameter; and
generating an instruction from the agent layer to resolve the exception, the instruction including a modification to the operational model, the instruction redefining the predetermined integrity level, thereby increasing the integrity of the computer network.

20. The computer-readable device of claim 19, wherein the operations further comprise:
modifying the set of model operational parameters in response to the instruction to resolve the exception and increase the integrity of the computer network; and
modifying the operational model in response to the exception.

* * * * *